April 23, 1940.   H. S. BAYLESS ET AL   2,198,073
SHORT WAVE THERAPY UNIT
Filed Sept. 28, 1936   2 Sheets-Sheet 2
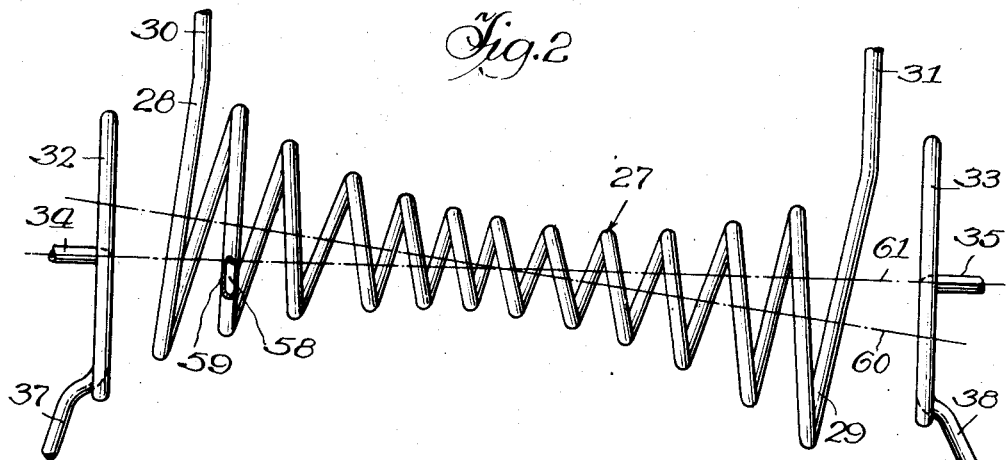
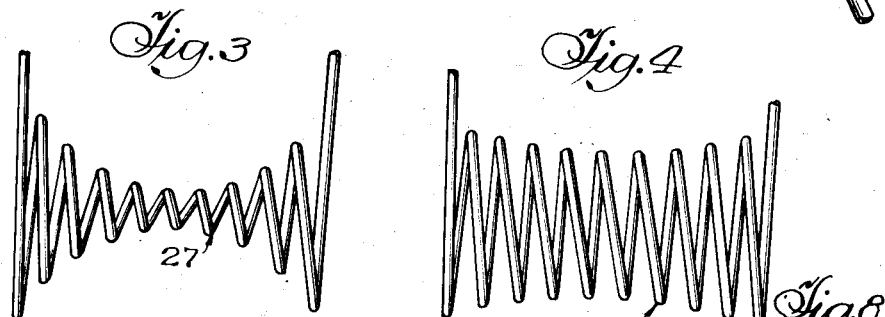
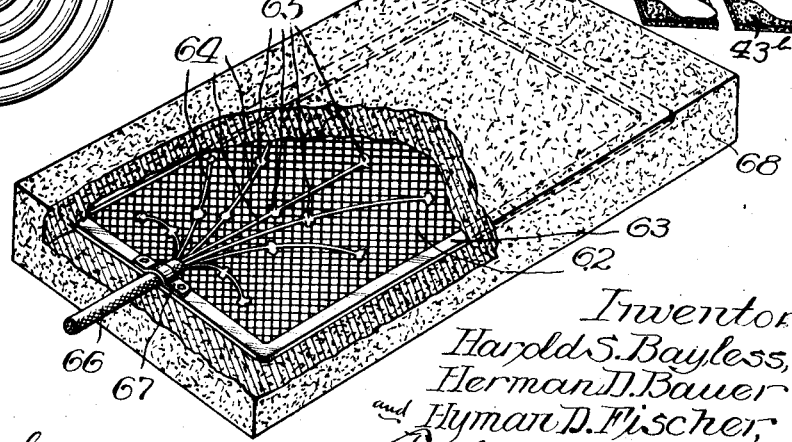
Inventors,
Harold S. Bayless,
Herman D. Bauer
and Hyman D. Fischer,
Parkinson & Lane, Attys.
Witness
Chas. E. Koursh.

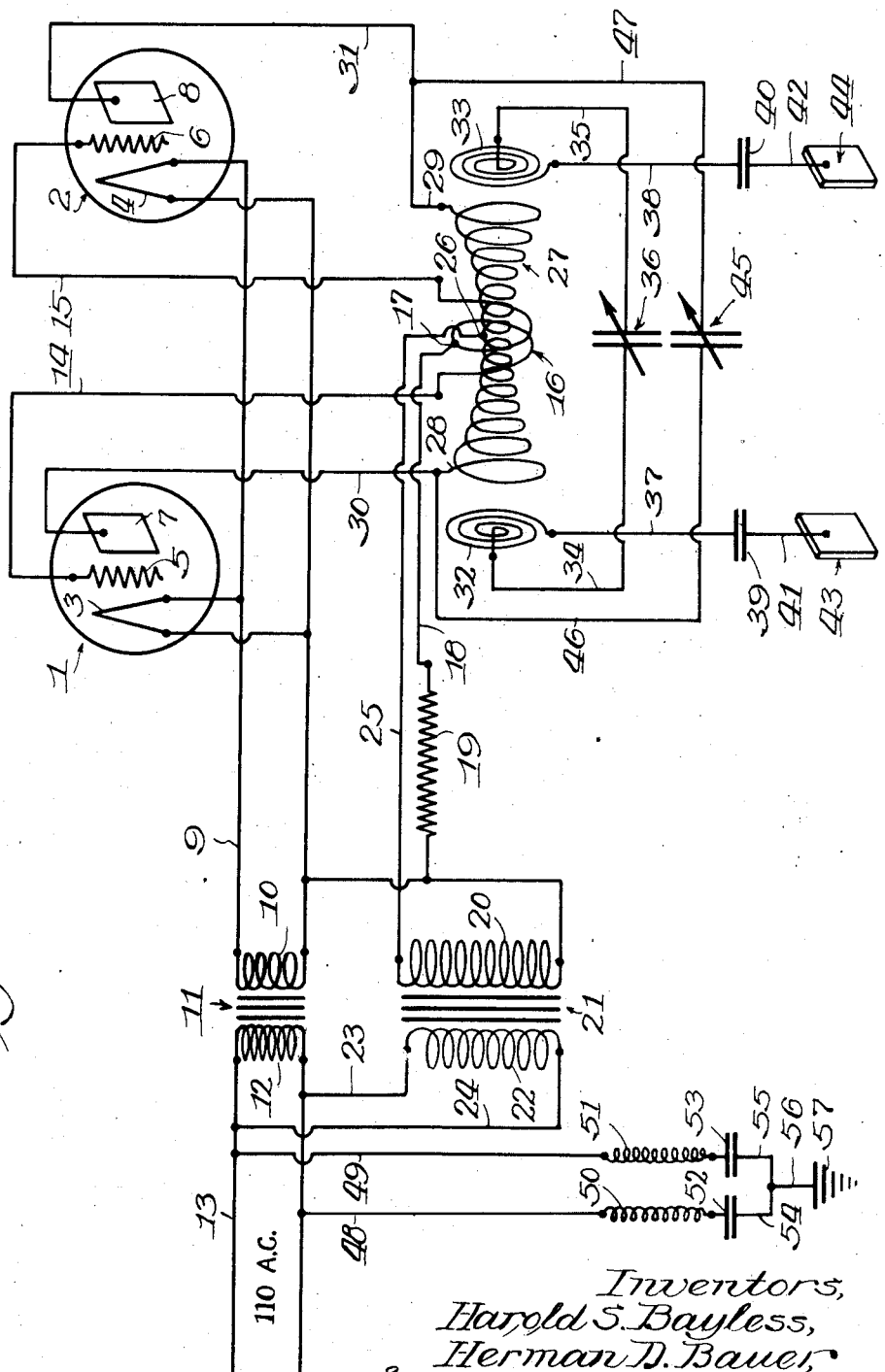

Patented Apr. 23, 1940

2,198,073

UNITED STATES PATENT OFFICE 2,198,073

SHORT WAVE THERAPY UNIT

Harold S. Bayless, Herman D. Bauer, and Hyman D. Fischer, Chicago, Ill.

Application September 28, 1936, Serial No. 102,912

2 Claims. (Cl. 128—422)

The present invention relates to means for electro-therapy.

Among the objects of the invention is to provide a novel device for treating patients with high frequency or short wave electromagnetic energy or the like, such means being in the nature of an electro-therapy device comprising one or more thermionic valves provided with the usual heated filaments or cathodes, grids and anodes or plates connected to the input circuit and with the grids in circuit with a grid coil inductively coupled to a conversion coil connected to the plates or anodes, the conversion coil being in turn inductively coupled to pick up coils in the output circuit to the electrodes for the patient.

The resonance of the output circuit is controlled by one or more variable capacities or condensers designed to effect the desired frequency of the electromagnetic energy imparted to the patient.

Another object of the invention is to provide a novel inductance couple between the grid and plate circuits, with or without a novel couple between the conversion and pick-up coils for the output.

A further object of the invention is to provide a novel frequency or resonance control or adjustment for the inductive couples or couplings above mentioned, for varying the output frequency along the resonance band or spectrum within the desired range, with or without a master variable capacity or condenser for selectively adjusting the range over such band or spectrum, the master capacity acting to adjust, set or shift the range mentioned and controlled by the above tuning condenser to the desired locus of said band or spectrum whereby the tuning condenser may vary or tune within the adjusted range mentioned above.

Another object of the invention is to provide a novel device comprising an adjustable arrangement of the inductive couples wherein the axis of the conversion couple may be angularly varied relative to the axis of the pick-up coils, as also to the grid coil, whereby the inductive intensity or amplitude of waves may be varied as desired, the conversion being thus more efficiently effected.

A still further object of the invention is to provide a novel induction or conversion coil preferably having its convolutions disposed in the more intense flux paths of the electromagnetic lines of force, such a coil being generally conoidal in shape or form and also preferably annular in cross section or tubular so as to provide inner and outer surfaces for the action of the electrical energy.

Other objects, capabilities, advantages, features, and the like are comprehended by the invention as will later appear and as are inherently possessed by the invention.

Referring to the drawings:

Fig. 1 is a wiring diagram and diagrammatic view of the means constructed in accordance with the invention;

Fig. 2 is a plan view of the conversion coil and the pick-up coils, showing the mode of adjusting or varying the inductive coupling therebetween;

Figs. 3 and 4 are similar views of alternative forms of conversion coils;

Fig. 5 is a view in elevation of one of the pick-up coils;

Fig. 6 is a view in perspective, with parts in broken section, of one of the electrode pads used on the patient; and, Figs. 7 and 8 are perspective views showing the application of divided or bifurcated electrode pads upon different parts of the body of the patient.

Referring more in detail to the drawings the embodiment chosen to illustrate the invention is shown as comprising thermionic valves 1 and 2 respectively having cathodes or filaments 3 and 4, grids 5 and 6 and anodes 7 and 8. The cathodes 3 and 4 are heated from a circuit 9 containing the secondary 10 of a transformer 11, the primary 12 of which is in the supply circuit 13, which may carry the usual 110 volt A. C. energy. The grids 5 and 6 are connected by way of conductors 14 and 15 to a grid coil 16, from the center tap 17 of which runs a conductor 18 by way of a biasing high resistance 19 to a secondary 20 of a transformer 21, the primary 22 of which is connected by way of conductors 23 and 24 to the input line 13. The secondary 20 runs by way of a conductor 25 to a center tap 26 of an inductance or converting coil 27 the opposite ends 28 and 29 of which are connected to conductors 30 and 31 running to the anodes or plates 7 and 8. At the ends of the coil 27 are located, in suitably spaced relation, pick-up coils 32 and 33, which may be of pancake type, connected at an end thereof to conductors 34 and 35 leading to a variable condenser 36 of suitable capacity for varying the resonance of the output circuit, the other ends of the coils 32 and 33 being connected by way of conductors 37 and 38, condensers 39 and 40, conductors 41 and 42, to electrode pads 43 and 44 to be used on the patient. In shunt with the coil 27 may be provided a master variable condenser 45 connected by way of conductors 46 and 47 to the ends of the coil 27.

A filter system may be used to ground any strays, static, or the like, and it may comprise conductors 48 and 49, choke coils 50 and 51, condensers 52 and 53, conductors 54, 55 and 56, and ground 57, the system being connected across the input line 13 ahead of the transformers 11 and 21.

The coil 27 (see Figs. 2, 3, and 4) is preferably tubular so as to present an inner surface 58 and an outer surface 59 for the action of the electrical energy, and is also preferably coiled in the form of a reflex or concave conoid, the intermediate convolutions being of lesser diameter than the other convolutions. This form of coil has been found to be most efficient because the tubular convolutions are disposed in that portion of the magnetic field having greater flux density, said field being due to the magnetic lines of force, these lines usually being curved.

It has also been discovered that the best results are obtained when the coil 27 is so disposed with relation to the coils 32 and 33 as to have its axis 60 at an acute angle to the axis 61 of the pickup coils 32 and 33, the angularity depending upon the physical characteristics of the coils, such as the linear length of the tubing used, the axial length of the coil 27 in general, the diameter of the tubing used in the coils 27, 32 and 33, the thickness of the material between the inner and outer surfaces of the tubing, the size and relation of the convolutions, the nature of the metal used, such as copper, brass, or the like etc. The proper angle may be readily determined by a simple test in connection with a suitable indicating or measuring instrument. While we are not prepared to state the theory of action, yet it appears that it is due to the loosening or tightening of the inductive coupling between the coil 27 and the pickup coils 32 and 33, and apparently the effect is the narrowing or sharpening of the tuning in the range of frequencies, the coil 27 is designed to produce. More-over, the effect also appears to be one of amplitude of the waves, that is, as the tuning is sharpened the amplitude increases. The coil 27 in our invention, is so designed as to be set at the desired angle corresponding to the intensity of the out-put desired.

Figs. 3 and 4 show alternative forms of coil 27 and are so designed as to give different output effects as desired or needed.

The pickup coils 32 and 33 are preferably of the flat spiral or pancake type, although they may be of different forms as desired. They are also preferably tubular for the same reason stated above in connection with coil 27. Also, the grid coil 16, is preferably tubular for the same reason.

The electrode pads 43 and 44 each comprises a metal plate 62 preferably of open work such as a screen or perforated sheet fixed in a frame 63, and conductor branches 64 integrally or fixedly united to the plate 62, as by soldering, brazing, welding, or the like, at suitable points or spots 65, these conductors being united or grouped into a cable 66, having a suitable insulating covering, the cable being held in place by a suitable securing element, such as a bracket or clip 67, suitably secured to the frame 63. The plate 62 with its frame 63 and the elements 64 and 65 are preferably embedded in a pad 68 of electrically non-conducting fibrous material, such as cotton, wool, pulp fibres, flax fibres, silk, or the like.

The present invention is of what may be termed the short wave radio type and is preferably designed to operate in that portion of the band or spectrum of frequencies from about 30 meters wave length to a fraction of a meter wave length. It differs from the diathermic device in which the operation is on the "spark gap" principle, metal electrodes are used and which directly contact the surface of the patient, and the wave lengths run from about 100 meters to 500 meters, no thermionic tube being used in spark gap oscillation generators. The oscillations or alternations are controlled by a micrometer adjuster for the spark gap and the resulting alternating induction effect is in the nature of a transformer. The heat effect in the body of the patient results from the resistance of the body cells or tissues as the energy passes through the body between the electrodes.

In the present invention, on the other hand, the electrodes do not touch the patient, there being quite a thickness of pad material between the metal plate 62 and the surface of the patient. The frequencies are in that range of the band or spectrum between about 30 meters to a fraction of a meter, thus covering what is known as the short and the ultra short waves. The effect on the patient, whether it be termed heat or otherwise, is a spreading or diffusing of the energy throughout the whole body of the patient, at a very low current intensity similar to beams of light emanating from the electrodes as sources. While we are not prepared to say what may be the exact effect, yet it appears to be an electronic effect on the tissues or the chemicals or both in the body of the patient. When the output energy is concentrated at the point or edge of a therapic needle or so called "radio knife," the effect is a coagulation of the tissues.

Referring again to the diagram in Fig. 1, it will be seen that there are two controlling variable condensers 36 and 45. For the purpose of illustration, the coil 27 may be designed to induce frequencies in the output circuit of from about 30 meters in length to a fraction of a meter when the condenser 45 is regulated or adjusted. The condenser 45 is, therefore, so designed that when it is opened the coil operates at 30 meters, there being no by-passing in the shunt circuit of the condenser 45. On the other hand, the condenser 36 which is in shunt with the pickup coils 32 and 33, may be designed, as for example, to vary the resonance or tuning of the output circuit with a 7½ meter range, that is, by way of example, from a frequency of 30 meters wave length to a frequency of 22½ meters wave length when the condenser 45 is full open as given above. When the condenser is partly closed, say a quarter way, then the coil operates at a frequency of 22½ meters wave length, and then the condenser 36 will vary the tuning or resonance over a range of 7½, that is, between 22½ meters wave length to 15 meters wave length. Furthermore, when the condenser 45 is set at half so that the coil operates at a frequency of 15 meters wave length, the condenser 36 then tunes from 15 meters wave length to 7½ meters wave length. When the condenser 45 is at three-quarters closed the coil 27 operates at a frequency of 7½ meters wave length and the condenser 36 then tunes from 7½ meters wave length to a small fraction of a meter. It will thus be seen that the condenser 36 tunes with a fine adjustment or regulation from whatever setting is made by the condenser 45. In this way the whole range of short and ultra short waves may be obtained without the necessity of changing a coil 27 of a range for another by removal and replacement as has been necessary heretofore.

In some cases when it is desired to treat two portions of the body, such as both sides of the chest or both feet at the same time, the electrodes may be "bifurcated" as shown in Figs. 7 and 8, wherein (Fig. 7) the electrodes 43ª and 43ᵇ may be applied to the chest and corresponding electrodes 44ª and 44ᵇ are respectively applied to the back, and (Fig. 8) the electrodes 43ª and 43ᵇ may be applied to the feet and the electrodes 44ª and 44ᵇ may be correspondingly applied to the calves of the legs, as shown.

While we have herein described, and upon the drawings shown an illustrative embodiment of the invention, it is to be understood that the invention comprehends other structures, arrangements of parts, details, features or the like without departing from the spirit of the invention.

Having thus disclosed the invention,

We claim:

1. An electro-therapy device comprising thermionic valves having cathodes, grids and anodes, an input circuit, a transformed circuit from said input circuit to said cathodes to heat said cathodes, a transformed circuit from said input circuit to said grids and said anodes, a grid coil in the circuit of said grids, a conversion inductance coil in the circuit of said anodes, pick-up coils inductively coupled to said conversion coil, said coils being of tubular material to present inner and outer electrically active surfaces, said conversion and pick-up coils being so arranged and located as to be varied in angular relation of the axes thereof, said conversion coil having its convolutions so varied in diameter as to be in generally conoidal form, electrode pads electrically connected to said pick-up coils, and a variable capacity connected in shunt with said pick-up coils for tuning the resonance of the circuit to said electrode pads.

2. An electro-therapy device comprising thermionic valves having cathodes, grids and anodes, an input circuit, a transformed circuit from said input circuit to said cathodes to heat said cathodes, a transformed circuit from said input circuit to said grids and said anodes, a grid coil in the circuit of said grids, a conversion inductance coil in the circuit of said anodes, pick-up coils inductively coupled to said conversion coil, said coils being of tubular material to present inner and outer electrically active surfaces, said conversion and pick-up coils being so arranged and located as to be varied in angular relation of the axes thereof, said conversion coil having its convolutions so varied in diameter as to be in generally conoidal form, electrode pads electrically connected to said pick-up coils, a variable capacity connected in shunt with said pick-up coils for tuning the resonance of the circuit to said electrode pads, and a variable capacity connected in shunt with said conversion coil for adjusting the frequency range for said circuit to said electrode pads.

HAROLD S. BAYLESS.
HERMAN D. BAUER.
HYMAN D. FISCHER.